United States Patent
Di Censo et al.

(10) Patent No.: US 9,864,570 B2
(45) Date of Patent: Jan. 9, 2018

(54) PROXIMITY BASED TEMPORARY AUDIO SHARING

(71) Applicant: Harman International Industries, Incorporated, Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 14/564,247

(22) Filed: Dec. 9, 2014

(65) Prior Publication Data

US 2016/0162252 A1  Jun. 9, 2016

(51) Int. Cl.
| | | |
|---|---|---|
| G06F 17/00 | (2006.01) | |
| G06F 3/16 | (2006.01) | |
| G11B 27/11 | (2006.01) | |
| H04W 4/02 | (2009.01) | |
| H04L 29/08 | (2006.01) | |
| H04W 4/00 | (2009.01) | |

(52) U.S. Cl.
CPC ............. *G06F 3/165* (2013.01); *G11B 27/11* (2013.01); *H04L 67/04* (2013.01); *H04L 67/1097* (2013.01); *H04L 67/125* (2013.01); *H04L 67/18* (2013.01); *H04W 4/023* (2013.01); *H04W 4/008* (2013.01)

(58) Field of Classification Search
CPC ....... H04W 4/008; H04W 84/18; G06F 21/10; G06F 17/3074; G06F 17/30772
See application file for complete search history.

(56) References Cited

U.S. PATENT DOCUMENTS

| | | | |
|---|---|---|---|
| 8,782,136 B1 | 7/2014 | Ho et al. | |
| 2008/0081558 A1* | 4/2008 | Dunko | G11B 27/002 455/41.1 |
| 2008/0091717 A1 | 4/2008 | Garbow et al. | |
| 2008/0305738 A1* | 12/2008 | Khedouri | G06F 17/30038 455/3.06 |
| 2009/0171487 A1* | 7/2009 | Wilhelm | G11B 27/10 700/94 |
| 2009/0282102 A1* | 11/2009 | Geurts | G06F 21/10 709/204 |
| 2012/0290648 A1 | 11/2012 | Sharkey | |

(Continued)

OTHER PUBLICATIONS

K. O'Hara and B. Brown (eds.), Consuming Music Together: Social and Collaborative Aspects of Music 2006 Springer, Printed in the Netherlands, Consumption Technologies, 173-190, Chapter 9, Car Drivers Using Sound Pryer—Joint Music Listening In Traffic Encounters, Mattias Östergren and Oskar Juhlin.*

(Continued)

*Primary Examiner* — Joseph Saunders, Jr.
(74) *Attorney, Agent, or Firm* — Artegis Law Group, LLP

(57) ABSTRACT

Systems, methods, and computer program products to perform an operation comprising upon determining that a first media device playing a first audio content and a second media device playing a second audio content are within a predefined distance, causing at least a segment of the first audio content to be played on the second media device, and causing at least a segment of the second audio content to be played on the first media device.

21 Claims, 5 Drawing Sheets

(56) References Cited

U.S. PATENT DOCUMENTS

2013/0103851 A1* 4/2013 Umeki .............. G06F 17/30026
                                                 709/231
2016/0103652 A1* 4/2016 Kuniansky .............. G06F 3/165
                                                 700/94

OTHER PUBLICATIONS

Extended European Search Report Application No. 15196401.2, dated Jun. 7, 2016, 7 pages.

* cited by examiner

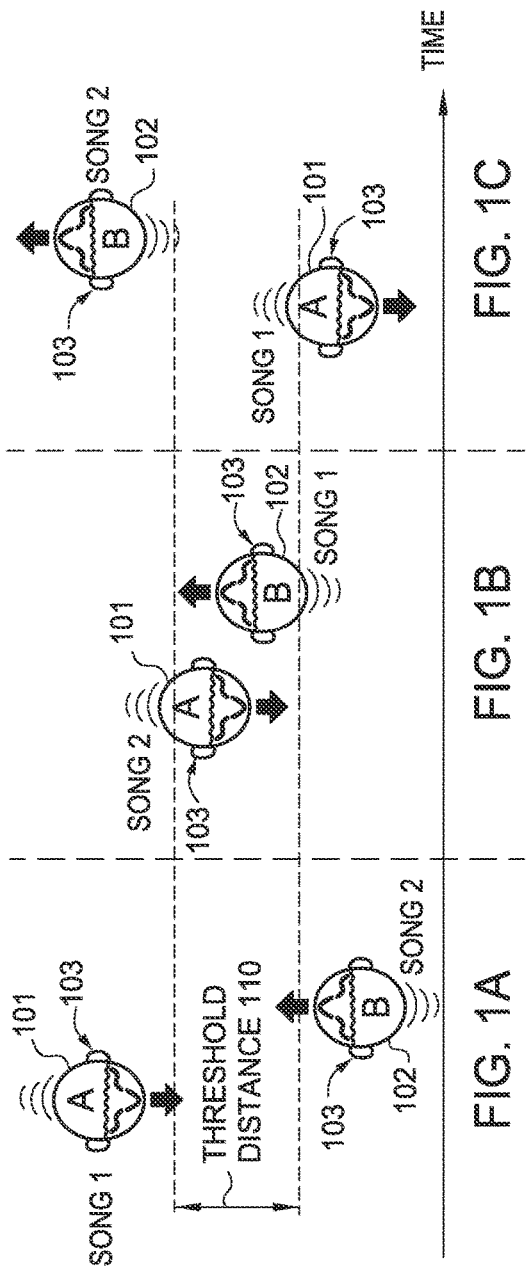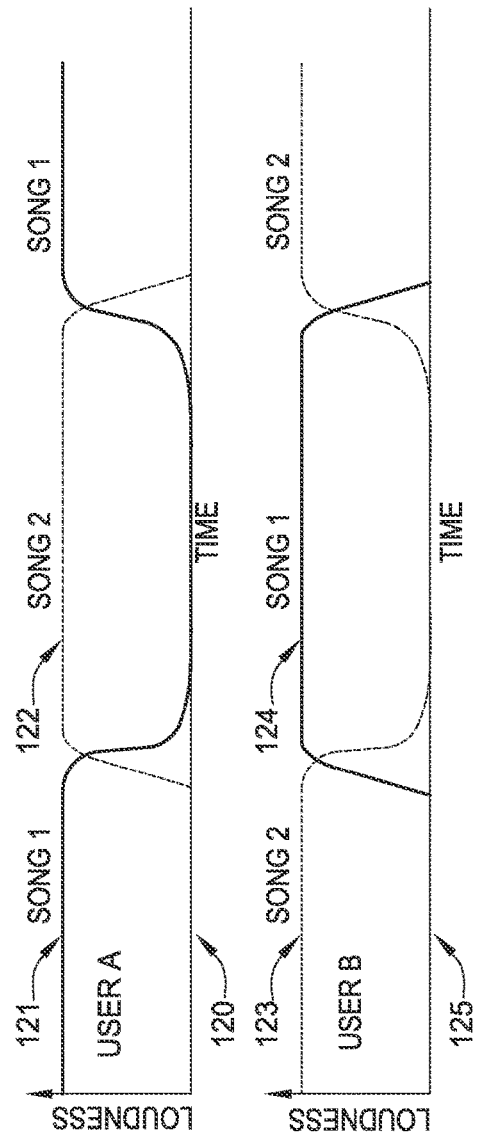

PROXIMITY BASED TEMPORARY AUDIO SHARING

BACKGROUND

The present disclosure relates to sharing digital audio, and more specifically, proximity based temporary audio sharing.

SUMMARY

Aspects disclosed herein include systems, methods, and computer program products to perform an operation comprising upon determining that a first media device playing a first audio content and a second media device playing a second audio content are within a predefined distance, causing at least a segment of the first audio content to be played on the second media device, and causing at least a segment of the second audio content to be played on the first media device.

BRIEF DESCRIPTION OF THE SEVERAL VIEWS OF THE DRAWINGS

FIGS. 1A-1E are schematics illustrating proximity based temporary audio sharing, according to one aspect.

DETAILED DESCRIPTION

Figure 2:
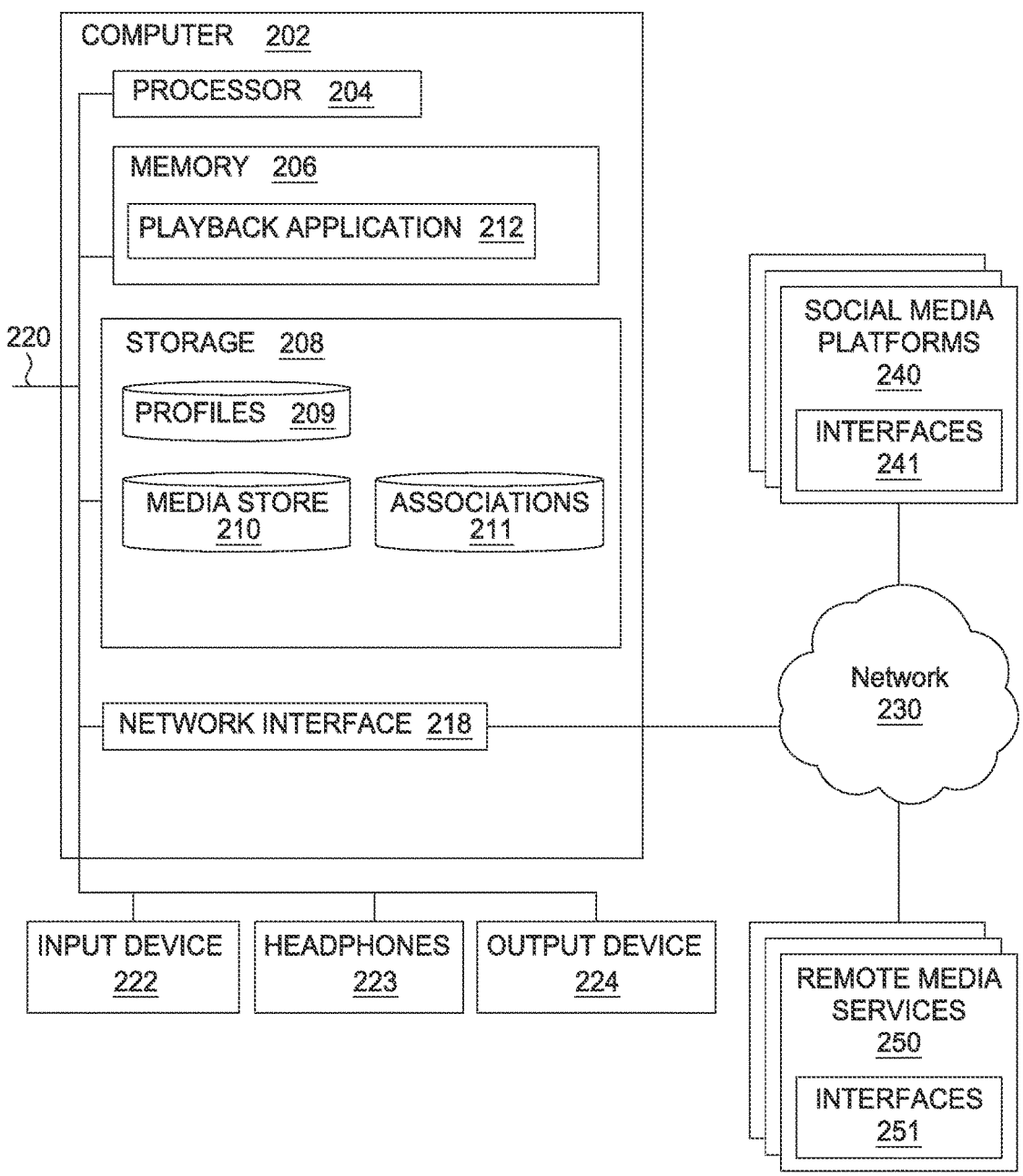
FIG. 2 illustrates a system to provide proximity based temporary audio sharing, according to one aspect.

Aspects disclosed herein provide techniques to share samples of music (or any digital audio) between users who are within close proximity of each other. When two participating users come within a threshold distance of each other, the music being played on their media player fades out, while the other user's music fades in. A sample of the other user's music will be played for a predefined duration, or until the users are no longer within proximity of each other. Users may then be presented different options, including, without limitation, to search for information about the music sample they just heard (such as title, artist, and other information), purchase the sampled music, share the sampled music on social media sites, connect with the other user via social media.

As used herein, the term "audio content" may refer to any type of digital audio content, including music, songs, podcasts, narratives, interviews, radio broadcasts, and the like. Generally, any type of audio content may be shared between media devices. Similarly, the audio content may be live or recorded. Any specific examples used herein should not be considered limiting of the disclosure.

FIG. 1A is a schematic illustrating proximity based temporary audio sharing, according to one aspect. As shown, a user A 101 is listening to song 1 via a set of headphones 103. Similarly, a second user, user B 102 is listening to song 2 via a set of headphones 103. The headphones 103 may include a wireless radio, a processor, and memory (all not pictured) to enable playback of local and remote audio and/or video. In other aspects, the headphones 103 output audio generated by a media player, computer, or other device (all not pictured). As shown, the users are approaching each other, but remain outside of a threshold distance 110 from each other. The threshold distance 110 may be any distance, such as 3 meters, and may vary based on the wireless technologies used to establish communications between the headphones 103.

However, when the users enter within the threshold distance 110, as depicted in FIG. 1B, the songs are shared, such that song 2 is outputted on user A 101's headphones 103, while song 1 is outputted on user B 102's headphones. The headphones 103 (or media playback devices) may first establish a wireless connection (using technologies such as Bluetooth, Wi-Fi, NFC, and the like). Once connected, the shared songs may be transferred over the connection. Alternatively, the respective headphones (or devices) may share information about the songs, enabling the devices to download the audio of the songs from the Internet.

The shared songs may play for a predefined duration, such as 10 seconds. Therefore, song 2 may play for user A 101 for 10 seconds, while song 1 may play for user B 102 for 10 seconds. The shared songs may play from any point of the song. For example, if 50 seconds of song 1 played back on user A 101's headphones when the users entered the threshold distance 110, song 1 may begin playback at 50 seconds on user B 102's headphones. Similarly, playback of the shared songs may begin from the start of the respective songs. Further still, a random segment of each shared song may be played on the other user's headphones. For example, the segment of song 1 played for user B 102 may span from 20 seconds to 30 seconds in song 1, while the segment of song 2 played for user A 101 may span from 2 minutes 15 seconds to 2 minutes 25 seconds.

The transition between songs on the respective headphones may take any form, such as a fade transition. Alternatively, the song being played may stop in order to allow the shared song to begin playback. In order to share songs, the users 101-102 may provide an indication to participate in music sharing. For example, the users may opt-in to the service, or toggle an indication requesting to search for nearby devices that are also willing to share music.

When the segment of the shared song is complete, the originally played song may resume playback. Therefore, when the shared songs finish playback, song 1 (or the next queued song) is played for user A 101, while song 2 (or the next queued song) is played for user B 102. Similarly, when the users are no longer within the threshold distance 110, playback of the shared songs may cease. Therefore, as shown in FIG. 1C, when the users are no longer within the threshold distance 110, song 1 is played for user A 101, while song 2 is played for user B 102. However, in some aspects, the segment may finish playback (if the entire segment has been received) even if the segment of the shared song has not finished playback before the users leave the threshold distance 110.

FIG. 1D is a graph 120 illustrating proximity based temporary audio sharing, according to one aspect. The graph 120 reflects the loudness of each song played for user A in FIGS. 1A-1C over time. As shown, user A 101 initially hears song 1 (represented by line 121) until the users enter within the threshold distance 110, at which point, song 1 begins to fade out, while song 2 (represented by line 122) begins to fade in. Song 2 then plays for a predefined duration (or until the users are no longer within the threshold distance 110), at which point song 2 fades out, while song 1 fades in.

FIG. 1E is a graph 125 illustrating proximity based temporary audio sharing, according to one aspect. The graph 120 reflects the loudness of each song played for user B in FIGS. 1A-1C over time. As shown, user B 102 initially hears song 2 (represented by line 123) until the users enter within the threshold distance 110, at which point, song 2 begins to fade out, while song 1 (represented by line 124) begins to fade in. Song 1 then plays for a predefined duration (or until the users are no longer within the threshold distance 110), at which point song 1 fades out, while song 2 fades in.

Once a user has heard a shared song, aspects may allow the user to perform many different operations. For example, the user may search for identification information about the song (if none was provided during playback of the sample). Similarly, the user may request to purchase the song, at which point, the user may be provided with a portal to purchase the song. Furthermore, the user may share the sample (or the entire song) via social media sites, email, multimedia messaging, and the like. Indeed, the user may push the sample to another user who may like the song. Further still, if one (or both) of the users 101, 102 express an indication to connect with the other user, the users may be able to exchange contact information, or may connect via one or more social media platforms.

FIG. 2 illustrates a system 200 to provide proximity based temporary audio sharing, according to one aspect. The networked system 200 includes a computer 202. The computer 202 may also be connected to other computers via a network 230. In general, the network 230 may be a telecommunications network and/or a wide area network (WAN). In a particular aspect, the network 230 is the Internet. The computer 202 may be any computing device configured to output audio, including without limitation, a media player, a smartphone, a laptop or other portable computer, a game console, a smart watch, a head mounted display device (such as glasses), or a tablet computer. Similarly, the computer 202 may be integrated into any device, such as wearable headphones, the head mounted display device, a smart watch, or an in-vehicle entertainment (or infotainment) system.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

The headphones 223 may be a pair of small loudspeakers that are designed to be held in place in, on, or close to a user's ears. The headphones 223 may take any form factor. As previously indicated, the computer 202 may be integrated in the headphones 223, such as wireless Bluetooth headphones that playback remote (or streaming) audio, or headphones that play media from local storage.

As shown, the memory 206 contains the playback application 212, which is an application generally configured to facilitate music sharing between users who are within proximity of each other. Generally, the playback application 212 may play any type of song or audio file to a user via the headphones 223 (or output device 224). However, when a first computer 202 comes within a threshold distance 110 of a second computer 202 participating in music sharing, the playback application 212 may cause the first and second computers to establish a wireless data connection, share information about the songs currently being played, and cause the songs to be played on the other computer. Specifically, if song A is playing on the first computer and song B is playing on the second computer, the playback application 212 may stop playback of song A on the first computer, and cause a segment of song B to be played back on the first computer. Similarly, the playback application 212 may stop playback of song B on the second computer, and cause a segment song A to be played on the second computer. The instances of the playback application 212 may transmit the segments of songs between the devices, or the instances of the playback application 212 may retrieve the segments of the songs from a remote location on the Internet. When the segments of the songs finish playing, the playback application 212 may cause the originally played songs to resume playback. Similarly, if the users are no longer within the threshold distance 110, the playback application 212 may stop playback of the shared audio content.

In some aspects, multiple computers 202 may be within the threshold distance 110. In such a case, the playback application 212 may sequentially play back segments of songs of all nearby users on the respective devices (if user preferences specify to playback from all nearby users). However, if the users do not wish to listen to shared music from all other users, the playback application 212 may randomly pair the user with another user. Alternatively, the playback application 212 may pair the user with a subset of nearby users based on one or more user preferences in the profiles 209. For example, if the profiles of four users out of ten (that are within the threshold distance 110) specify hip-hop as a preferred genre, then the playback application 212 may initiate sharing between these four users in sequence.

The playback application 212 may also allow the user to perform different actions responsive to hearing a shared song, such as retrieving identification information of the shared song from the social media platforms 250, providing a portal to purchase the shared song via the remote media services 250, allowing the user to share the song (via social media platforms 240, email, and the like).

As shown, storage 208 contains the profiles 209, media store 210, and associations 211. The profiles 209 is generally configured to store user data, such as identification information, preferences, and the like. For example, user Z's profile information may reflect a preference for foreign music, while user Y's profile may reflect a preference for bluegrass music. Additionally, the profile 209 may specify multi-user settings, such as whether a user wishes to automatically interact with all nearby users in the event more than one user is in proximity. The media store 210 may include different digital audio files that may be played by the playback application 212 to a local user, or shared with a remote user. The associations 211 may include relationships between users, including levels of separation between different users in the event a direct relationship does not exist. The playback application 212 may leverage data in the profiles 209 and associations 211 in order to pair users for music sharing as described herein.

As previously indicated, the playback application 212 may provide users a portal to social media platforms 240 and remote media services 250 via respective interfaces 241 and 251. Generally, the social media platforms 240 are social networking sites that allow users to interact with each other. For example, users may use the playback application 212 to share songs on their own profiles on the social media platforms 240. The remote media services 250 include services to search for audio content, play audio content, purchase audio content, and the like. For example, a user may use the playback application 212 to search for a shared audio content via a remote media service 250, and once the user has received identification information for the shared audio content, the user may use the playback application 212 to purchase the identified audio content via a remote media service 250.

Figure 3:
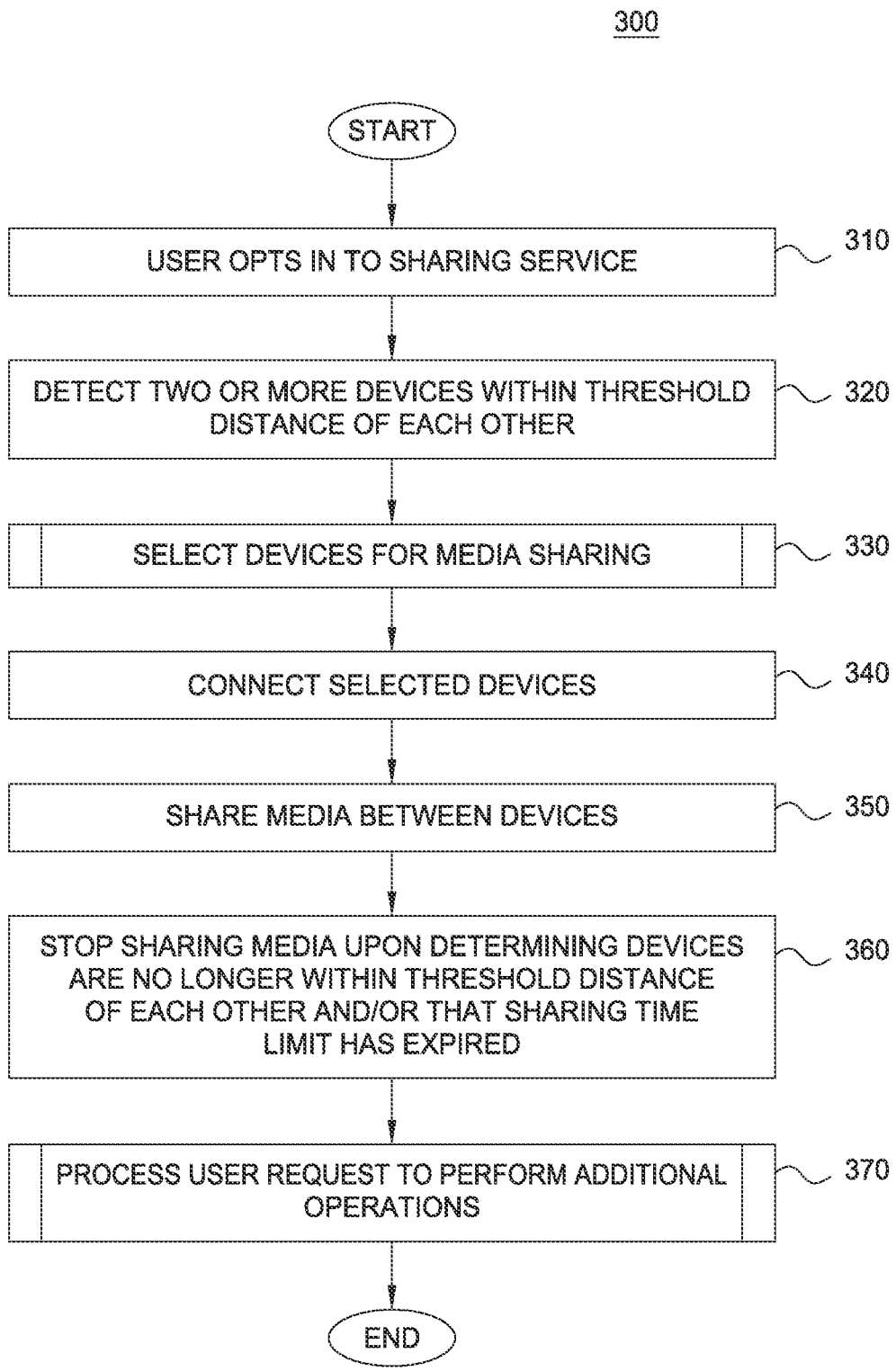
FIG. 3 illustrates a method to provide proximity based temporary audio sharing, according to one aspect.

FIG. 3 illustrates a method 300 to provide proximity based temporary audio sharing, according to one aspect. Generally, the steps of the method 300 automatically share segments of audio content between devices that are within proximity of each other. For example, if user X, listening to Beethoven's Moonlight Sonata, comes into proximity with user Y, listening to an audio podcast, the playback application 212 on each user's device may share the audio content such that user X hears a segment of the audio podcast, while user Y hears a segment of Moonlight Sonata.

The method 300 begins at step 310, where a user opts into the sharing service provided by the playback application 212. The user may opt in via a stored setting that makes his or her device available to share audio. Alternatively, the user may provide a request to scan for nearby devices that are sharing audio. At step 320, the playback application 212 may detect two or more devices within a threshold distance of the user's media playback device. As previously indicated, the media playback device may be any device capable of playing audio and performing wireless data communications, such as portable media players, laptop computers, tablet computers, vehicles with infotainment systems, headphones with integrated wireless chipsets, and the like. The devices may use any suitable technique for proximity detection, such as radio frequency (RF) detection (such as via Bluetooth or Wi-Fi beacon signals), infrared signals, location sharing services or applications (such as the "Find My Friends" application by Apple® Inc.) and the like. The threshold distance may be any distance within which the devices can communicate wirelessly.

At step 330, described in greater detail with reference to FIG. 4, the playback application 212 may select nearby devices for sharing of audio content. The playback application 212 may select the nearby devices for sharing based on any number of factors, such as a number of available nearby devices, common interests or preferences, shared connections, settings in the user profiles 209, and the like. At step 340, the playback application 212 on each device may wirelessly connect to create ad-hoc wireless communication networks, such that the playback applications 212 may stream their currently playing audio content to the paired device. In another aspect, the playback applications 212 may connect to each other by first connecting to the Internet using independent cellular network communication, or leveraging connectivity of a paired smartphone. Once connected to the Internet, the playback applications 212 on each device may then communicate. Regardless of the communication route, the playback application 212 on each device may share information regarding the currently playing audio content, user preferences or other data in the profiles 209, and connection or friendship data in the associations 211. At step 350, the playback applications 212 may share the audio content currently playing on its respective device with the playback application 212 on the paired device. Therefore, for example, if user A is listening to Vivaldi's Four Seasons, while user B is listening to Mozart's Requiem in D Minor, the playback application 212 on user A's device will play Mozart, while the playback application 212 on user B's device will play Vivaldi. The playback applications 212 may transfer the audio content directly between devices, or the playback applications 212 may cause the respective device to download the audio content from the Internet.

At step 360, the playback applications 212 on each device may stop sharing the audio content upon determining that the devices are no longer within the threshold distance and/or upon determining that a time limit for sharing the audio content has expired. For example, if the users were in the same coffee shop when the audio content sharing began, but one (or both) users subsequently left the coffee shop, the playback application 212 may stop playing the shared content. However, in some aspects, the playback applications 212 may allow the segment of the shared content to continue playing until the time limit has been reached. Similarly, if two vehicles are stopped at a stop light, their infotainment systems may play the shared music until the vehicles turn in different directions and are no longer within the threshold distance. The time limit may be any amount of time, such as 10 seconds, which sets a maximum amount of time that a user can listen to another user's audio content. Doing so may maintain compliance with copyright laws and contractual obligations. At step 370, described in greater detail with reference to FIG. 5, the playback application 212 may process user requests to perform additional operations responsive to hearing the shared audio content from the other user. For example, the user may request to identify the shared audio content, purchase the shared audio content, share the shared audio content with others, and connect with the other user via social media or other platforms.

Figure 4:
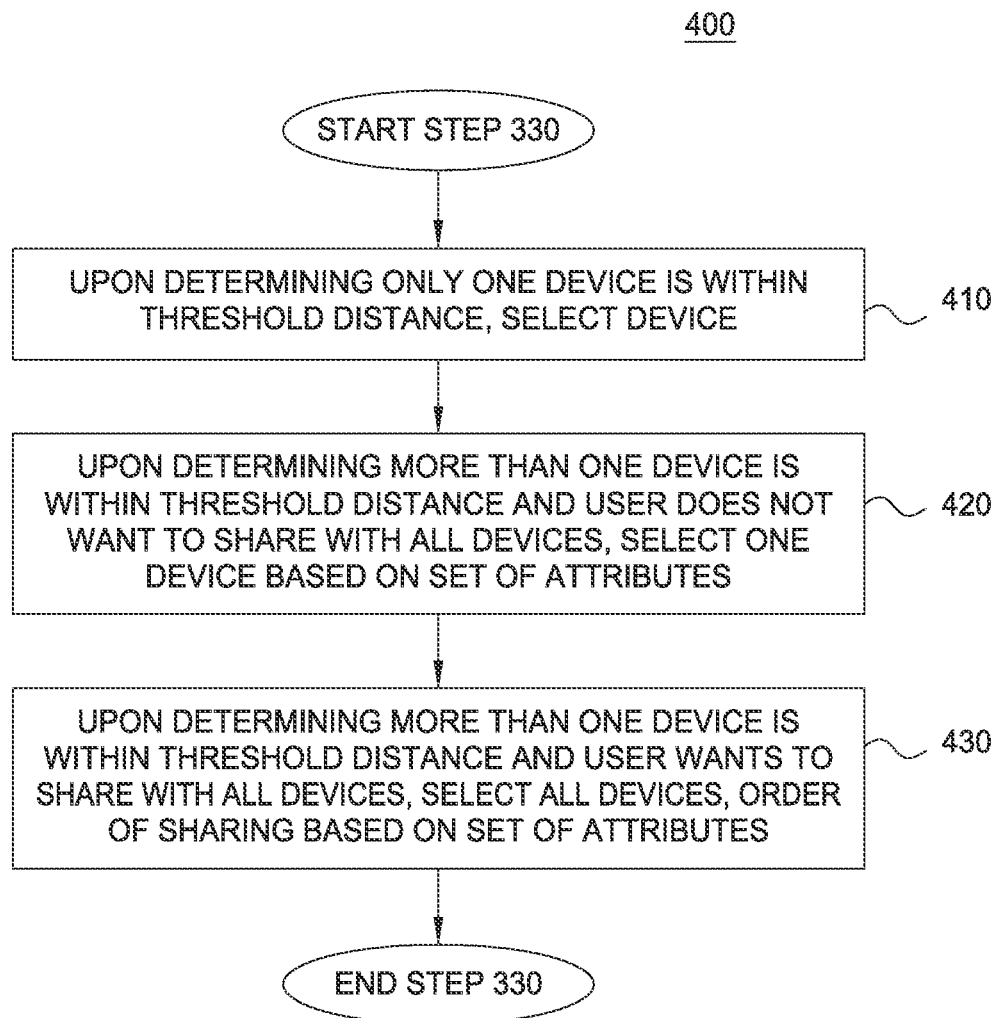
FIG. 4 illustrates a method to select devices for media sharing, according to one aspect.

FIG. 4 illustrates a method 400 corresponding to step 330 to select devices for audio content sharing, according to one aspect. Generally, the playback application 212 may perform the steps of the method 400 in order to ensure participating devices are paired with at least one nearby device in order to share (and receive) audio content between the devices. While the steps of the method 400 are described from the perspective of a single instance of the playback application 212 executing on a device, the same process may be followed by other devices in order to ensure that all devices are paired with at least one device. At step 410, the playback application 212 may, upon determining that only one device is within the threshold distance of the current device (namely, two total devices are within proximity of each other), select the one nearby device to pair with the current device.

At step 420, the playback application 212 may select one nearby device to pair with the current device upon determining that more than one device is within the threshold distance but that the user of the current device does not wish to share music with all nearby devices. For example, user preferences in the current device may specify to not share with all nearby devices but only one (or two, or any number) of devices. In such a case, the playback application 212 may select one nearby device based on a set of attributes, such as the nearest device (by distance), which song the other device is currently playing, preferences in each user's profile, music genres that the users do not like, friendship connections and levels of separation, and the like. For example, user A's profile may specify country music as a dislike and classical music as a preference. If user B's nearby device is currently playing country music, the playback application 212 may not select user B's device, as user A has expressly indicated they do not like country music. However, if user C's nearby device is playing Beethoven, the playback application 212 may select user C's device due to the preferred musical genre. Similarly, the playback application 212 may compare preferences in the user profile to find the users who share the most in common (such a likes and dislikes), and pair those users. If the user's settings specify to share audio with a maximum of 3 users, the playback application 212 may pair the user's device with up to three devices based on the above attributes.

At step 430, the playback application 212 may select all nearby devices for sharing audio content upon determining that more than one device is within the threshold distance, and that the user wishes to share content with all devices. In such a case, the playback application 212 may select each nearby device, such that the devices share audio content in sequence. The playback application 212 may order the sequence of device sharing according to any methodology, such as placing users with similar preferences at the beginning of the queue, randomly ordering the devices, and the like.

Figure 5:
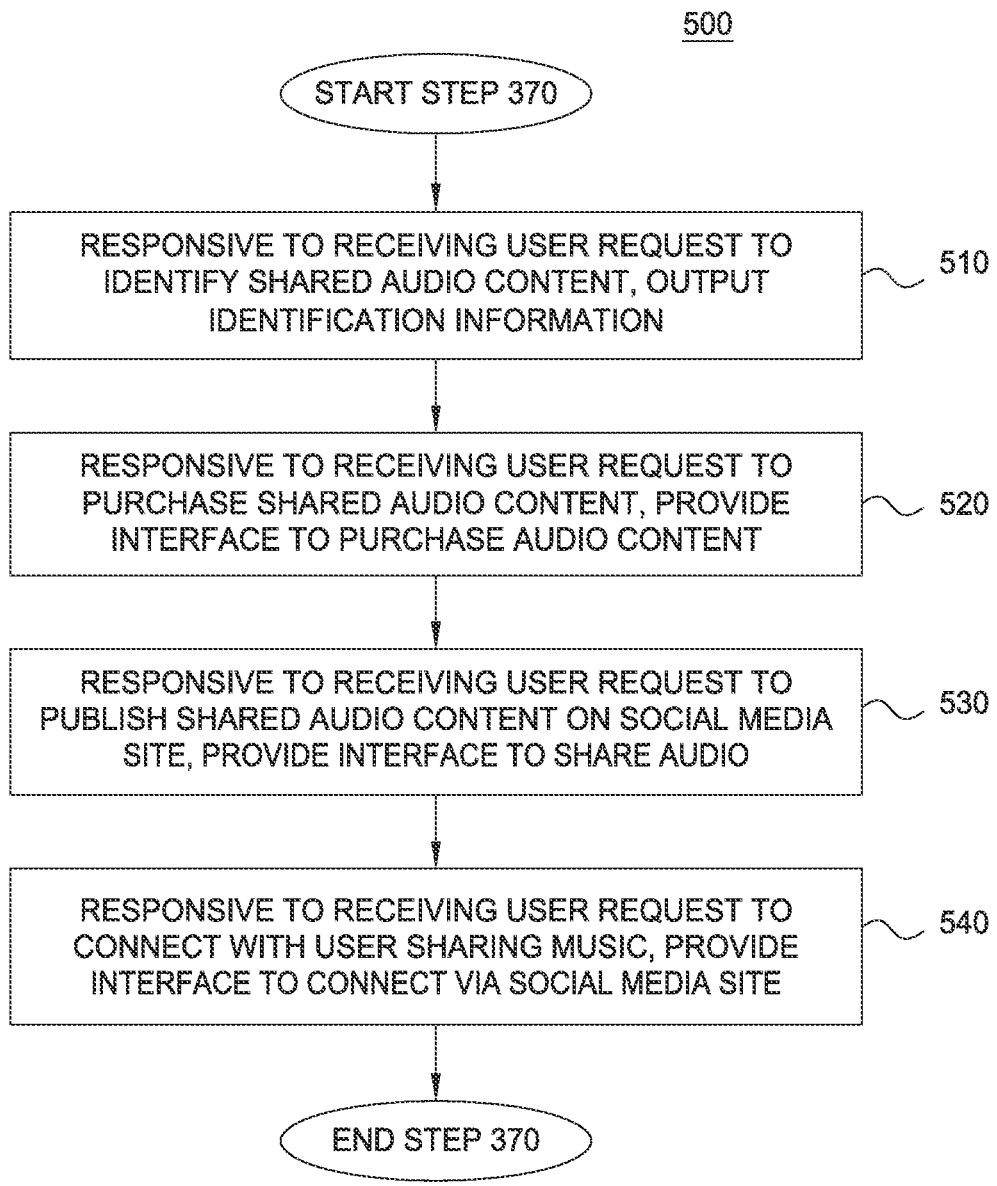
FIG. 5 illustrates a method to process user requests to perform additional operations, according to one aspect.

FIG. 5 illustrates a method 500 corresponding to step 370 to process user requests to perform additional operations, according to one aspect. Generally, the steps of the method 500 describe example functionalities that the playback application 212 may provide to a user who has heard shared audio content from a nearby device. At step 510, the playback application 212 may output identification information of the shared audio content responsive to a user request to identify the shared audio content. For example, if the user hears a new song (but is unaware of the title, artist, or album information), the user may request the identification information. In response, the playback application 212 may access an online portal which may analyze the song and provide the correct identification information for the song. At step 520, the playback application 212 may provide an interface for the user to purchase the shared audio content responsive to a user request to purchase the shared audio content. For example, once the shared audio content finishes playing, the playback application 212 may display a link to purchase the shared media. If the user selects the link, the playback application 212 may direct the user to a portal to purchase the shared audio content. At step 530, the playback application 212 may provide an interface to publish the shared audio content on a social media platform responsive to a user request. For example, if the user wishes to post a link to the shared audio content on a friend's social media profile, the playback application 212 may provide an interface to the social media platform to post the link on the friend's profile. Similarly, the playback application 212 may share the shared media through other formats, such as email, social media messages, text messages, multimedia messages, and the like. At step 540, the playback application 212 may provide an interface to create a relationship with the user sharing the shared media responsive to a user request to connect with the other user. For example, if user A loves the sample of user B's music, user A may wish to connect with user B on a social networking site. In response, the playback application 212 may identify user B's contact information (such as a URL to a social networking profile in the profiles 209), and provide an interface to send a friend request to user B. Similarly, the playback application 212 may facilitate the sharing of other contact information, such as email addresses and phone numbers.

Advantageously, aspects disclosed herein allow users to share audio content with nearby devices. The sharing may be triggered by proximity (or a user request to search for nearby devices). When two devices are paired, the devices share the audio content such that each device plays back the audio content of the other device. Users have a great interest in sharing music over social media sites, and aspects disclosed herein may facilitate the sharing of music as well as the development of friendships and other relationships.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the foregoing, reference is made to aspects presented in this disclosure. However, the scope of the present disclosure is not limited to specific described aspects. Instead, any combination of the features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the recited aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   determining, via at least one wireless receiver, that a first media device is within a threshold distance of a plurality of media devices;
   selecting, based on at least one musical preference associated with the first media device, a second media device included in the plurality of media devices while the first media device is playing first audio content, and the second audio device is playing second audio content, wherein the first audio content is different than the second audio content; and based on the selecting:
　causing, via a first processor included in the second media device, at least a segment of the first audio content to be automatically played on the second media device, and
　causing, via a second processor included in the first media device, at least a segment of the second audio content to be automatically played on the first media device.

2. The method of claim 1, further comprising:
　upon determining that the first and second media devices are no longer within the threshold distance:
　　resuming playback of the first audio content on the first media device; and
　　resuming playback of the second audio content on the second media device.

3. The method of claim 1, wherein a duration of the segments of the first and second audio contents played on the second and first media devices, respectively, are less than a predefined time threshold.

4. The method of claim 1, wherein the first audio content and the second audio content are transferred between the media devices by a wireless data connection.

5. The method of claim 1, further comprising:
　receiving a request on the first media device to identify the second audio content; and
　outputting, on the first media device, identification information for the second audio content received via a wireless data connection of the first device.

6. The method of claim 1, wherein each of the first media device and the second media device comprises one of a smart phone, a set of headphones, a tablet computer, a laptop computer, an infotainment system in a vehicle, a smart watch, a head-mounted display device, and a portable media player.

7. The method of claim 1, wherein the at least one musical preference comprises a preferred genre that is stored in both the first media device and the second media device.

8. The method of claim 1, wherein selecting the second media device is further based on at least one social media connection that is shared between the first media device and the second media device.

9. A non-transitory computer readable storage medium, comprising:
　computer-readable program code which, when executed by a processor, causes the processor to perform an operation comprising:
　　determining, via at least one wireless receiver, that a first media device is within a threshold distance of a plurality of media devices;
　　selecting, based on at least one musical preference associated with the first media device, a second media device included in the plurality of media devices while the first media device is playing first audio content, and the second audio device is playing second audio content, wherein the first audio content is different than the second audio content; and
　　based on the selecting:
　　　causing, via a first processor included in the second media device, at least a segment of the first audio content to be automatically played on the second media device, and
　　　causing, via a second processor included in the first media device, at least a segment of the second audio content to be automatically played on the first media device.

10. The non-transitory computer readable storage medium of claim 9, wherein causing the segment of the first audio content to be played on the second media device comprises:
　fading a volume of the second audio content on the second media device while increasing a volume of the segment of the first audio content on the on the second media device.

11. The non-transitory computer readable storage medium of claim 9, further comprising:
　sharing, by the first media device, the second audio content on at least one social networking site.

12. The non-transitory computer readable storage medium of claim 9, further comprising:
　prior to causing the segment of the first audio content to be played on the second media device, receiving a request on the second device to enable playback of the segment of the first audio content on the second device.

13. The non-transitory computer readable storage medium of claim 9, wherein the segments of the first audio content and the second audio content are received from the Internet via network connections of the respective media devices.

14. The non-transitory computer readable storage medium of claim 9, further comprising:
　determining, via the at least one wireless receiver, that the first media device is within the threshold range of a plurality of other media devices, each of the plurality of other media devices playing a respective audio content; and
　in response, subsequent to playing the second audio content on the first media device, causing the first media device to sequentially play a segment of the respective audio content played on each of the plurality of other media devices.

15. The non-transitory computer readable storage medium of claim 9, further comprising:
　upon determining that a time threshold has elapsed:
　　resuming playback of the first audio content on the first media device; and
　　resuming playback of the second audio content on the second media device.

16. A system, comprising:
　a processor;
　a wireless receiver; and
　a memory containing a program, which, when executed by the processor, causes the processor to perform an operation comprising:
　　determining, via the wireless receiver, that the system is within a threshold distance of a plurality of media devices;
　　selecting, based on at least one musical preference associated with the system, a first media device included in the plurality of media devices while the system is playing a first audio content and the first media device is playing a second audio content, wherein the first audio content is different than the second audio content;
　　based on the selecting:
　　　causing at least a segment of the first audio content to be automatically played on the first media device; and
　　　causing at least a segment of the second audio content to be automatically played on the system.

17. The system of claim 16, the operation further comprising, prior to determining that the system is within the threshold distance of the plurality of media devices, receiving, by the system, a request to search for nearby media devices playing music.

18. The system of claim 16, further comprising:
providing an interface on the system to purchase the second audio content responsive to receiving a request on the system to purchase the second audio content.

19. The system of claim 16, wherein the wireless receiver comprises at least one of a Bluetooth receiver, an IEEE 802.11 wireless receiver, and an infrared receiver.

20. The system of claim 16, the operation further comprising:
responsive to receiving, by the system, a request to identify the second audio content:
receiving identification information for the second audio content; and
outputting, via the system, an audio indication of the identification information for the second audio content.

21. The system of claim 16, the operation further comprising:
stopping playback of the second audio content on the system upon determining at least one of:
that a time threshold has elapsed; and
that the system is no longer within the threshold distance of the first media device.

* * * * *